US010760938B2

(12) United States Patent
Newman et al.

(10) Patent No.: US 10,760,938 B2
(45) Date of Patent: Sep. 1, 2020

(54) LIQUID LEVEL DETECTOR

(71) Applicant: Aspen Pumps Limited, Sussex (GB)

(72) Inventors: Alexander Grahame Newman, East Sussex (GB); Joseph Sharpstone, Eastbourne (GB); Gary Paul Haffenden, East Sussex (GB)

(73) Assignee: Aspen Pumps Limited, Sussex (GB)

( * ) Notice: Subject to any disclaimer, the term of this patent is extended or adjusted under 35 U.S.C. 154(b) by 662 days.

(21) Appl. No.: 15/516,114

(22) PCT Filed: Oct. 14, 2015

(86) PCT No.: PCT/GB2015/053040
§ 371 (c)(1),
(2) Date: Mar. 31, 2017

(87) PCT Pub. No.: WO2016/059409
PCT Pub. Date: Apr. 21, 2016

(65) Prior Publication Data
US 2018/0231412 A1 Aug. 16, 2018

(30) Foreign Application Priority Data
Oct. 14, 2014 (GB) .................................. 1418198.6

(51) Int. Cl.
*G01F 23/26* (2006.01)
*F24F 13/22* (2006.01)
(Continued)

(52) U.S. Cl.
CPC .......... *G01F 23/268* (2013.01); *F24F 13/222* (2013.01); *F25D 21/14* (2013.01);
(Continued)

(58) Field of Classification Search
CPC .... G01F 23/266; G01F 23/263; G01F 23/268; G01F 1/363; G01F 13/006; F25D 21/14;
(Continued)

(56) References Cited

U.S. PATENT DOCUMENTS 2,699,523 A * 1/1955 Meyers ................. G01F 23/263
361/284
5,017,909 A * 5/1991 Goekler ................. G01F 23/265
340/620
(Continued)

FOREIGN PATENT DOCUMENTS

CN 101990603 A 3/2011
CN 102494735 A 6/2012
(Continued)

OTHER PUBLICATIONS

PCT International Search Report, dated Oct. 25, 2016 21 pages.
(Continued)

*Primary Examiner* — John Fitzgerald
*Assistant Examiner* — Truong D Phan
(74) *Attorney, Agent, or Firm* — Seyfarth Shaw LLP

(57) ABSTRACT

A liquid level detector for use in a pump control system comprises a chamber 20 for liquid, a liquid inlet 6 to the chamber 20, a liquid outlet 7 from the chamber and connectable to a pump, and a capacitive sensor comprising mutually spaced capacitive sensor elements (21, 22; 22, 23) forming a capacitance which is sensitive to permittivity within a region of the chamber proximate the capacitive sensor. The chamber is defined at least partially by a barrier member 25 and the capacitive sensor elements are provided on the barrier member outside the chamber.

11 Claims, 5 Drawing Sheets

(51) Int. Cl.
  *F28F 17/00* (2006.01)
  *F25D 21/14* (2006.01)
  *F24F 140/30* (2018.01)

(52) U.S. Cl.
  CPC .......... *F28F 17/005* (2013.01); *G01F 23/263* (2013.01); *G01F 23/266* (2013.01); *F24F 2140/30* (2018.01)

(58) Field of Classification Search
  CPC ......... F25D 21/04; F24F 13/22; F24F 13/222; F24F 2140/30; G05D 9/12; G05D 7/0635; F16K 37/0075; G01R 27/2605; G01D 5/24; G01D 5/2417; G06K 9/0002; G01P 15/125; F28F 17/005
  USPC .................. 73/304 C; 62/150; 700/281, 282; 324/658, 661, 686
  See application file for complete search history.

(56) References Cited

U.S. PATENT DOCUMENTS

| | | | | |
|---|---|---|---|---|
| 5,722,290 | A * | 3/1998 | Kronberg | G01F 23/265 324/664 |
| 2003/0094043 | A1* | 5/2003 | Marioni | G01F 23/263 73/304 C |
| 2004/0199131 | A1* | 10/2004 | Kitamura | A61F 5/451 604/318 |
| 2005/0045621 | A1* | 3/2005 | Chenier | A61H 33/005 219/490 |
| 2005/0172712 | A1* | 8/2005 | Nyce | G01F 23/263 73/304 C |
| 2009/0320587 | A1* | 12/2009 | Schoenmakers | G01F 23/265 73/304 C |
| 2010/0064705 | A1* | 3/2010 | Chauvin | F04B 49/02 62/150 |
| 2010/0097374 | A1* | 4/2010 | Fan | A61B 5/0535 345/420 |
| 2012/0258385 | A1* | 10/2012 | Hu | G01F 23/268 429/515 |
| 2013/0200905 | A1* | 8/2013 | Rhodes | G01N 27/223 324/667 |
| 2014/0075979 | A1* | 3/2014 | Rose | F24F 13/222 62/272 |
| 2016/0047683 | A1* | 2/2016 | Winkens | G01F 23/266 73/304 C |
| 2016/0051176 | A1* | 2/2016 | Ramos | A61B 5/208 600/573 |
| 2017/0299417 | A1* | 10/2017 | Otagaki | G01F 23/268 |

FOREIGN PATENT DOCUMENTS

| | | |
|---|---|---|
| CN | 103017863 A | 4/2013 |
| CN | 103364050 A | 10/2013 |
| EP | 0706045 A1 | 4/1996 |
| EP | 1312897 A2 | 5/2003 |
| EP | 2325935 A1 | 5/2011 |
| JP | S57153221 A | 9/1982 |
| JP | 61223618 A | 10/1986 |
| JP | 2007205812 * | 8/2007 |
| JP | 2007205812 A | 8/2007 |
| JP | 2007220453 A | 8/2007 |

OTHER PUBLICATIONS

Examination Report for Application No. GB1418198.6 dated Apr. 12, 2019, 6 pages.
Chinese Office Action for Application No. 201580054944.X dated Dec. 29, 2018, 15 pages.

* cited by examiner

LIQUID LEVEL DETECTOR

CROSS REFERENCE TO RELATED APPLICATIONS

This is a National Stage application of PCT/GB2015/053040, filed Oct. 14, 2015, and which claims priority to United Kingdom Patent Application Serial No. GB 1418198.6, filed Oct. 14, 2014, the disclosures of which are incorporated herein by reference.

This invention relates to a liquid level detector for use in a fluid pumping system.

BACKGROUND

Fluid pumps are used in a wide range of applications to move fluids (typically liquids) from a liquid storage tank to an inlet, or from a liquid reservoir to an outlet. One example application is in air conditioning systems.

Air conditioning systems are used to cool air by passing warm air through a heat exchanger, where the warm air comes into thermal contact with a cooler body, such as low pressure refrigerant fluid flowing through a pipe. As the air passes through the heat exchanger, thermal energy from the warm air is transferred to the cooler refrigerant fluid, cooling the air temperature and warming the refrigerant. As the air cools, the vapour pressure of the water constituent in the air reduces, and some of the water vapour condenses out of the air as water droplets. Typically, these condensed water drops first nucleate on the refrigerant pipes in the heat exchanger before running off the refrigerant pipe and collecting into a water reservoir.

In most household or small building installations of air conditioning systems, an outlet is provided from a bottom of the water reservoir to a lower point on an outside of the building. The water runs from the water reservoir to the outside of the building under the action of gravity, where it can enter the normal drainage systems also used for, for example, rainwater.

In larger buildings, it can be efficient to process multiple sources of waste water together or to reuse waste water in other systems within the building. This may require that the condensed water in the reservoir is transported to a liquid outlet at a higher point in the building. The water can be transported by pumping from the reservoir to the liquid outlet.

The flow rate of water into the reservoir of an air conditioning system is typically very low. For this reason, existing systems use a small reciprocating pump to transport the water from the reservoir to the liquid outlet. Even the small pumps typically have a pumping rate much greater than the flow rate of water into the reservoir. The lifetime of the pump may be significantly reduced or the pump may not work at all, should the pump be pumping air after all the water has been pumped from the reservoir. Therefore, the pumps are run only when required to clear the water from the reservoir. Between the outlet of the reservoir and the pump, there is a small filling chamber with a float switch. When the chamber is empty, the float is at a bottom of the chamber. As water passes from the outlet of the reservoir into the chamber, the water level in the chamber rises with the float on the surface of the water. A first switch operates at a predetermined filling level of the chamber to turn the pump on. When the water level drops significantly below this level, the pump will turn off. In order for the float switch to work correctly, it must be mounted at a precise angle, such that a guide rail over which the float travels is perpendicular to the surface of the water. An air inlet to the chamber is also required to allow trapped air to escape as the chamber fills with water. In some systems, a second switch is provided which is operated when the float is near to a top of the chamber, indicating the chamber is almost entirely filled with water. In the situation where there is a problem with the pump, this second switch serves as a safety mechanism which will shut down the air conditioning system, preventing water continually entering the chamber and the reservoir overflowing. The second switch is also operated if the air conditioning unit is generating a flow rate of condensate which exceeds the pumping capacity of the pump.

It is typically difficult to install the filling chambers in the correct orientation as many may be hidden behind the main air conditioning unit. If the unit is not installed in the correct orientation, the float switch may not work correctly, or at all. In some situations, the float may get stuck at the top of the chamber, even when the pump has operated to pump water from the outlet of the reservoir to the liquid outlet. In this situation, the pump will continue pumping, and may start to pump air, resulting in damage to the pump, or even to failure of the pump. The pump may also or instead generate excessive noise.

The present invention, at least in some embodiments, attempts to provide an alternative to fill level sensors of the prior art.

BRIEF SUMMARY OF THE DISCLOSURE

In accordance with the present invention viewed from a first aspect there is provided a liquid level detector for use in a pump control system, the liquid level detector comprises a chamber for liquid, a liquid inlet to the chamber, a liquid outlet from the chamber and connectable to a pump, and a first capacitive sensor comprising mutually spaced capacitive sensor elements forming a capacitance which is sensitive to permittivity within a region of the chamber proximate the first capacitive sensor. The chamber is defined at least partially by a barrier member and the capacitive sensor elements are provided on the barrier member outside the chamber.

Thus, in accordance with the present invention, the capacitive sensor elements are located outside the liquid chamber such that their sensitivity is not degraded by the liquid that enters the chamber.

In one embodiment, the barrier member is formed from a plastics material. The barrier member may be a tube. Desirably, the barrier member has a thickness of less than 1 mm, possibly less than 0.5 mm. A thin barrier member enhances the sensitivity of the capacitive sensor to the volume of liquid in the chamber.

In one embodiment, the liquid level detector comprises a second capacitive sensor spaced from the first capacitive sensor. The second capacitive sensor comprising mutually spaced capacitive sensor elements forming a capacitance which is sensitive to permittivity within a region of the chamber proximate the second capacitive sensor.

This in itself is believed to be novel and thus viewed from a further aspect, the invention provides a liquid level detector for use in a pump control system, the liquid level detector comprising a chamber for liquid, a liquid inlet to the chamber, a liquid outlet from the chamber and connectable to a pump, a first capacitive sensor comprising first and second mutually spaced capacitive sensor elements forming a capacitance which is sensitive to permittivity within a region of the chamber proximate the first capacitive sensor, and a second capacitive sensor spaced from the first capacitive sensor and comprising mutually spaced capacitive sensor elements forming a capacitance which is sensitive to permittivity within a region of the chamber proximate the second capacitive sensor.

In embodiments of the invention, the two spaced capacitive sensors allow the level of liquid in the chamber to be detected regardless of the orientation of the sensor. In one embodiment, one of the capacitive sensor elements is common to the first capacitive sensor and the second capacitive sensor.

In embodiments of the invention, the capacitive sensor elements are electrical conductors, for example copper bands. At least some of the capacitive sensor elements may each form a ring around the chamber. Desirably, the spacing between the mutually spaced capacitive sensor elements is less than 5 mm.

The liquid level detector may be provided with an electronic controller configured to receive an output of the first and/or second capacitive sensor and to generate a control signal for controlling a pump. The electronic controller may be provided as part of the liquid level detector or as part of the pump, for example.

In one embodiment, the controller is configured to generate the control signal by comparison of the output signal from the first and second capacitive sensors, whereby to control the pump in response to the liquid level in the chamber independently of the orientation of the chamber. Thus, the orientation of the chamber can be detected by a comparison of the differing response of the two capacitive sensors as the chamber fills with liquid.

In one embodiment, the electronic controller is configured for electrical connection to the first and/or second capacitive sensor, whereby the said capacitive sensor forms part of an oscillator circuit in the controller with the frequency of the oscillator circuit indicative of the capacitance of the said capacitive sensor.

Such an arrangement provides a particularly effective detection method and thus viewed from a further aspect the invention provides a liquid level detector in combination with an electronic controller for generating a control signal for controlling a pump, the liquid level detector comprising a chamber for liquid, a liquid inlet to the chamber, a liquid outlet from the chamber and connectable to a pump, and a capacitive sensor comprising mutually spaced capacitive sensor elements forming a capacitance which is sensitive to permittivity within a region of the chamber proximate the first capacitive sensor, wherein the electronic controller is configured for electrical connection to the capacitive sensor, whereby the capacitive sensor forms part of an oscillator circuit in the controller with the frequency of the oscillator circuit indicative of the capacitance of the capacitive sensor.

The controller may be configured to monitor the output signal from at least one capacitive sensor which is indicative of the volume of liquid in the chamber and to generate the control signal in response to the output signal, whereby to control the speed of the pump to maintain a desired volume of liquid in the chamber.

This is believed in itself to be novel and thus viewed from a further aspect the invention provides a liquid level detector in combination with an electronic controller for generating a control signal for controlling a pump, the liquid level detector comprising a chamber for liquid, a liquid inlet to the chamber, a liquid outlet from the chamber and connectable to a pump, and a capacitive sensor comprising mutually spaced capacitive sensor elements forming a capacitance which is sensitive to permittivity within a region of the chamber proximate the first capacitive sensor, wherein the controller is configured to monitor the output signal from the capacitive sensor which is indicative of the volume of liquid in the chamber and to generate the control signal in response to the output signal, whereby to control the speed of the pump to maintain a desired volume of liquid in the chamber.

In embodiments of the invention, the pump is a reciprocating pump. However, the invention is of application to other pumps. The invention extends to a liquid level detector as described adapted for connection to the condensate reservoir of an air conditioning system, a refrigeration system or a heating system. The invention further extends to an electronic controller for generating a control signal for controlling a pump and adapted for use with a liquid level detector of the invention. The invention further extends to a non-transitory physical storage medium containing computer readable instructions executable to perform or cause a microprocessor to operate as the electronic controller.

BRIEF DESCRIPTION OF THE DRAWINGS

Embodiments of the invention are further described hereinafter with reference to the accompanying drawings, in which.

DETAILED DESCRIPTION

Figure 1:
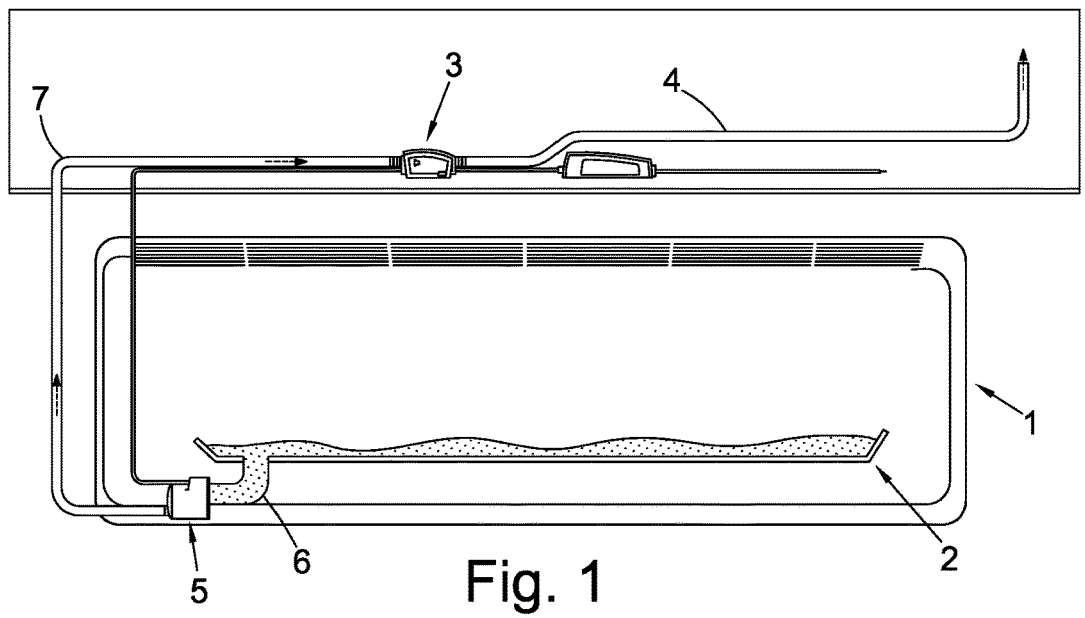
FIG. 1 is an illustration of an air conditioning system showing an embodiment of an aspect of the present invention in use.

FIG. 1 is an illustration of an air conditioning system configured in accordance with an embodiment of an aspect of the present invention. An air conditioning unit 1 is provided to cool air in a room. Condensate water produced as part of the cooling process is collected in a reservoir 2 positioned beneath refrigerating coils in the air conditioning unit. In some air conditioning systems, the reservoir 2 is emptied by gravity. However, in the presently illustrated embodiment, the reservoir is emptied using a pump 3, transporting water from the reservoir to a water outlet 4. Different types of pump are available, but in the presently described embodiment, the pump 3 is a reciprocating pump. When the pump 3 is switched on, water can be drained from the reservoir at a maximum flow rate of 100 ml/minute. Typically, the reservoir 2 is filled at a rate of 20 ml/minute. Therefore, the pump can run dry if it is operated when there is insufficient water in the reservoir 2. A fill level sensor is provided in a filling chamber 5 provided in the fluid path between the reservoir 2 and the pump 3. The filling chamber 5 is connected to the reservoir using filling chamber inlet pipe 6 and connected to the pump using filling chamber outlet pipe 7. As will be described in more detail with reference to FIG. 2, the filling chamber 5 is provided with sensors to determine the fill level of the filling chamber 5. The fill level can be used as an input in a control system configured to control the operation of the pump 3. In some embodiments, the pump may be controlled to turn on or turn off. Preferably, the pump 3 is operable at a range of pumping speeds. The optimum speed of the pump 3 is calculated based on the fill level of the filling chamber 5 and the current operation status of the pump 3. When the pump 3 is run constantly at a very low speed, this is quieter than running the pump 3 intermittently at a higher speed. The sound of the pump 3 is also significantly less noticeable when the pump remains operational all the time at a very low pumping rate rather than being operated intermittently at a higher speed.

Figure 2A:
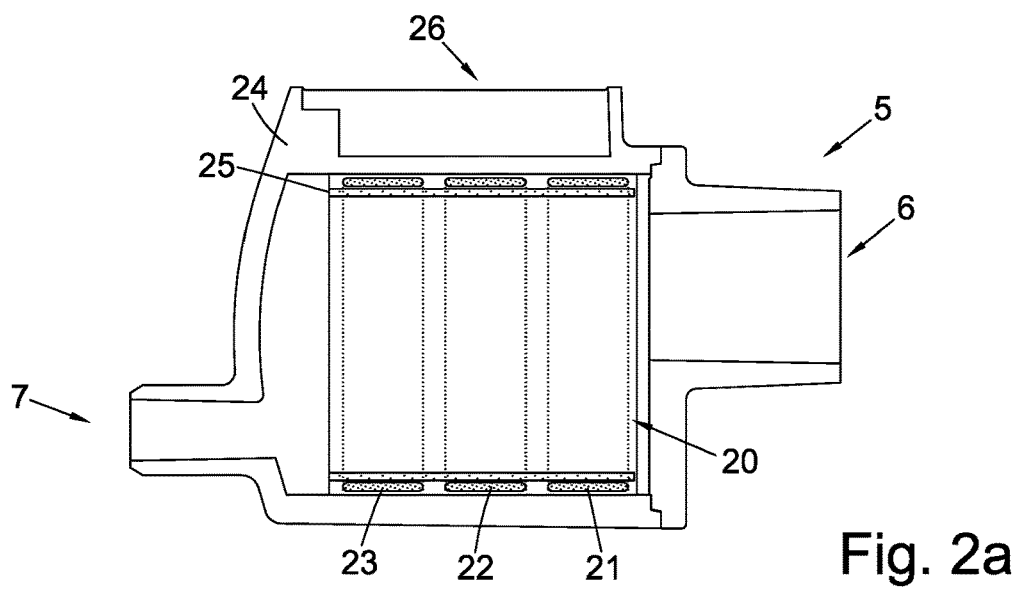
FIGS. 2a and 2b are illustrations of a filling chamber according to an embodiment of an aspect of the present invention.
Figure 2B:
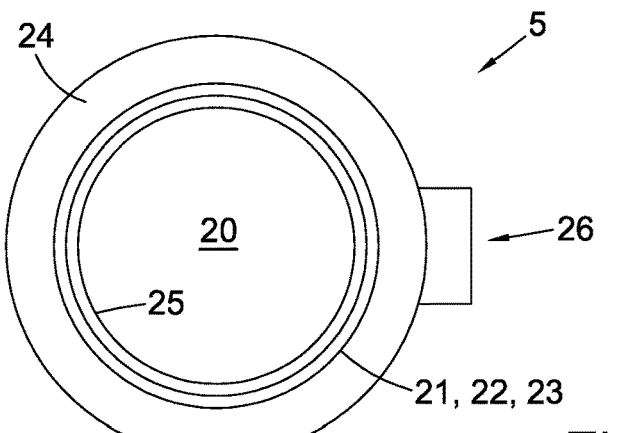

FIGS. 2a and 2b are illustrations of a filling chamber 5 according to an embodiment of an aspect of the present invention. As shown in FIG. 5, the filling chamber 5 is configured to receive water through the filling chamber inlet pipe 6. When the reservoir 2 is empty, air may also enter the filling chamber 5 through filling chamber inlet pipe 6. The filling chamber outlet pipe 7 provided at the bottom of the filling chamber 5 is connected to the pump 3. In order to prevent the pump 3 operating on a working fluid containing air bubbles, the fill level of the filling chamber 5 should never drop so low that air enters into filling chamber outlet pipe 7. An outer casing 24 is formed from moulded plastics material and encloses the filling chamber 5. As shown in FIG. 2b, the filling chamber 5 has a shape which is substantially tubular. A top copper band 21 is positioned in the outer casing 24 and near the filling chamber inlet pipe 6. A bottom copper band 23 is positioned in the outer casing 24 and near the filling chamber outlet pipe 7. An intermediate copper band 22 is also positioned in the outer casing 24 and between the bottom copper band 23 and the top copper band 21. The top copper band 21 provides a first conductive plate for an upper planar plate capacitive sensor. The bottom copper band 23 provides a first conductive plate for a lower planar plate capacitive sensor. The intermediate copper band 22 provides a common second conductive plate for both the upper planar plate capacitive sensor and the lower planar plate capacitive sensor. A spacing between the top copper band 21 and the intermediate copper band 22 and between the intermediate copper band 22 and the bottom copper band 23 must be small to ensure the sensor operates correctly. The spacing is 2.5 mm in the presently described example. The person skilled in the art will appreciate that alternative spacing values could be used. However, if the spacing between the top copper band 21 and the intermediate copper band 22 and between the intermediate copper band 22 and the bottom copper band 23 is too large, the sensor becomes very insensitive to changes in water level. Conversely, if the spacing is too small, the capacitance between the adjacent copper bands increases, also affecting the sensitivity of the sensor. A layer of thin tubing 25 is positioned between the copper bands 21, 22, 23 and a fluid channel 20 through which liquid is arranged to flow from the filling chamber inlet pipe 6 to the filling chamber outlet pipe 7. The thin tubing 25 substantially prevents fluid in the fluid channel 20 coming into contact with the copper bands 21, 22, 23. The thin tubing 25 has a thickness of 0.3 mm, at least in portions which are enclosing the copper bands 21, 22, 23. The electronics for the sensor are held within an electronics housing 26 arranged on an outside of the outer casing 24. The electronics housing also comprises a connector for connecting the sensor to a separate control circuit. In some embodiments, the sensor in the filling chamber 5 may electrically connect directly to the pump 3.

Relative permittivity is the ratio of the dielectric permittivity of a material to the dielectric permittivity of a vacuum. Air has a relative permittivity of approximately 1, depending on the gaseous composition of the particular air in question, as well as the temperature and pressure. In contrast, water has a relative permittivity of approximately 80 at room temperature, though this varies with temperature. The operation of the lower planar plate capacitive sensor will now be described. When there is no water present in the filling chamber 5, the dielectric is air. The bottom copper band 23 has a positive voltage applied to it and stores charge, creating an electric field around the lower copper band 23. The intermediate copper band 22 is held at a relatively negative potential, for example earth potential, resulting in the electric field lines being drawn towards the intermediate copper band 22. A number of the electric field lines pass outside the thin tubing 25, and into the fluid channel 20. Air has a low relative permittivity, so the effect on the electric field lines is small, and a capacitance between the bottom copper band 23 and the intermediate copper band 22 is small. When the filling chamber 5 is filled with water, the dielectric through which the field lines pass now has a far higher relative permittivity, which affects the electric field by reducing the electric field strength. This results in an increase in the capacitance between the bottom copper band 23 and the intermediate copper band 22. The thicker the thin tubing 25 in the portions over the copper bands, the less effect there will be of a change in the dielectric properties of the fluid within the filling chamber 5, because the tubing 25 also acts as a dielectric. The capacitance between the bottom copper band 23 and the intermediate copper band 22 can be measured by connecting the bands to an oscillator where the capacitance controls a frequency of the oscillator, for example by means of an RC circuit.

Where only part of the region of the fluid channel 20 around the capacitive sensor is filled with water, only part of the rings forming the bottom copper band 23 and the intermediate copper band 22 is proximate water with the remainder proximate air. Consequently, the capacitance of the lower planar plate capacitor has a value between that when the fluid channel 20 is empty and that when the fluid channel 20 is full. In this way, when the filling chamber 5 is in the orientation shown in FIG. 2a (and FIG. 4c) the capacitance of the lower planar capacitor is indicative of the fill level of the fluid channel 20.

Although the description above relates to the lower planar plate capacitive sensor, it will be appreciated that the upper planar plate capacitive sensor works in substantially the same way. By measuring the capacitance at at least two spaced points on the filling chamber 5 using the lower planar plate capacitor and the upper planar plate capacitor, the fill level of the filling chamber may be deduced in any orientation of the filling chamber 5, as will be described below.

Figure 3:
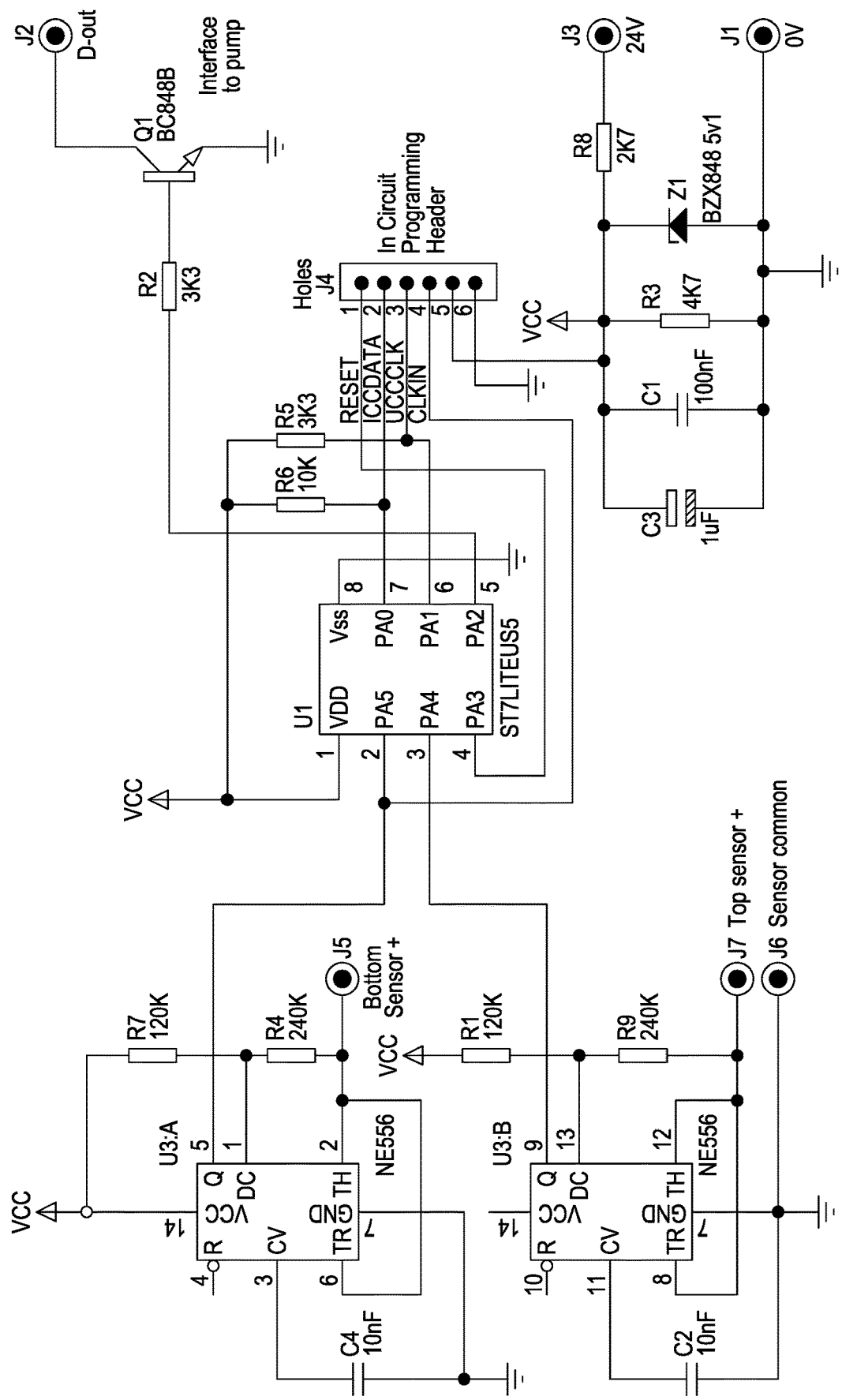
FIG. 3 is an illustration of a circuit diagram for a controller for operating the filling chamber of FIGS. 2a and 2b.

FIG. 3 is an illustration of a circuit diagram for operating the filling chamber of FIGS. 2a and 2b. In this diagram, J5 is connected to the bottom copper band 23, J6 is connected to the intermediate copper band 22, and J7 is connected to the top copper band 21. The NE556 integrated circuit is used to provide the equivalent of two timer microprocessors. Each pairing of J5 and J6, and J7 and J6 provides a capacitive sensor. In combination with the NE556 integrated circuit, a changing capacitance can be used to create an oscillating signal, where the frequency of oscillation is dependent upon the capacitance of the capacitive sensors. These signals are then input into a programmable microprocessor, containing logic configured to control the pump based on the frequency of the signal inputs. In some embodiments, the programmable microprocessor may be used to control the pumping speed of the pump. In other embodiments, the programmable microprocessor may only be used to switch the pump on and off.

Figure 4A:
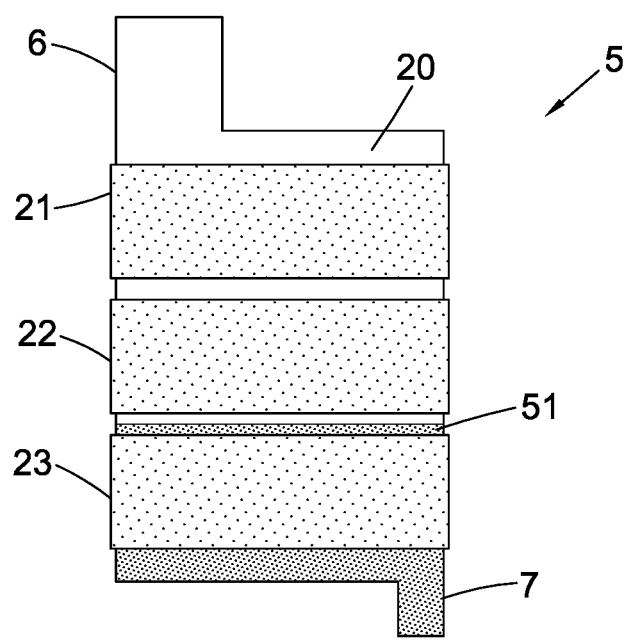
FIG. 4 is an illustration of the filling chamber of FIGS. 2a and 2b provided at different orientations.
Figure 4B:
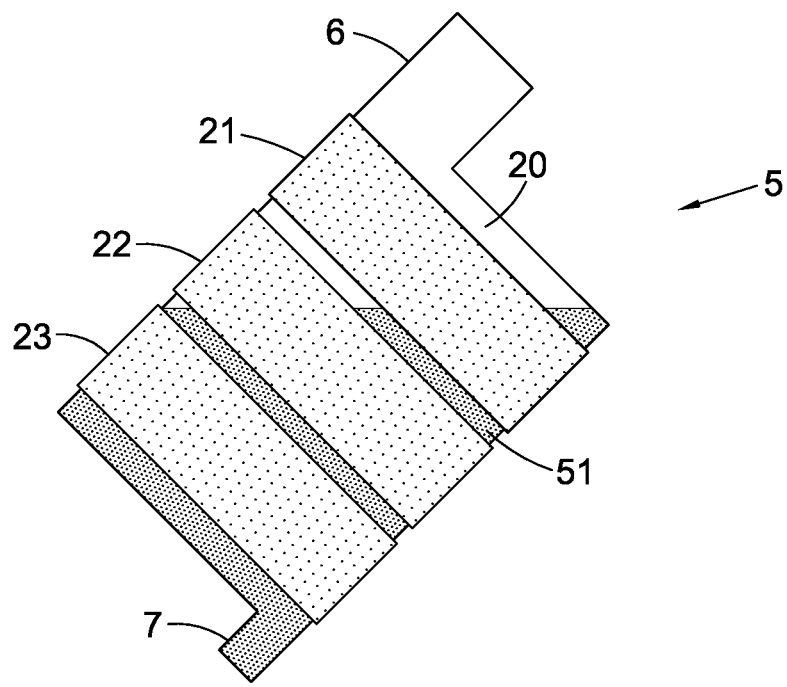
Figure 4C:
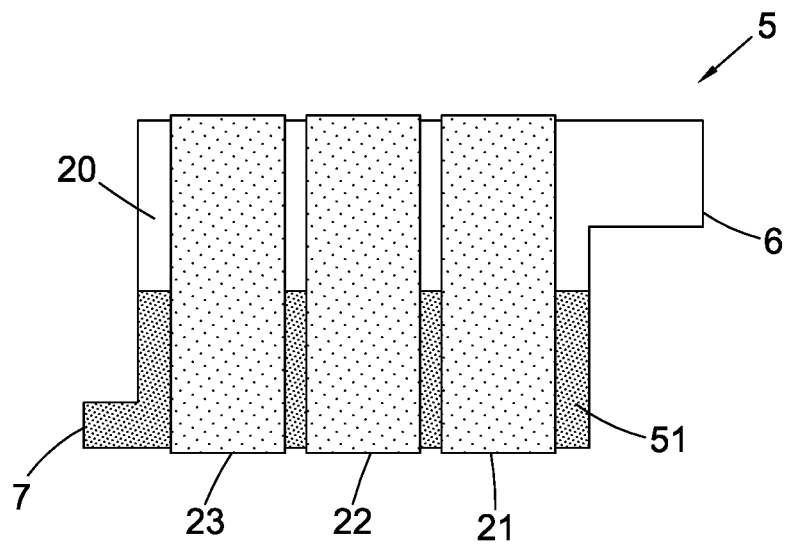

FIGS. 4a, 4b and 4c are illustrations of the filling chamber of FIG. 2 provided at different orientations. FIG. 4a shows a filling chamber 5 provided in a vertical orientation. The filling chamber outlet pipe 7 is at a bottom of the filling chamber 5, and the filling chamber inlet pipe 6 is at a top of the filling chamber 5. In this orientation, a rotation angle of the filling chamber about a central axis of the substantially cylindrical shape of the filling member 5 does not affect the effective operation of the filling chamber 5. The water 51 in the fluid channel 20 comes to a level which is just above the top of the bottom copper band 23. The water 51 is not present proximate the intermediate copper band 22 or the top copper band 21.

FIG. 4b shows a filling chamber 5 provided in an inclined orientation. The filling chamber 5 is shown rotated by an angle of substantially 45 degrees in a clockwise direction from the position shown in FIG. 4a. The filling chamber outlet pipe 7 is positioned on a lowermost part of a leftmost circular end face of the filling chamber 5. The filling chamber inlet pipe 6 is positioned on an uppermost part of a rightmost circular end face of the filling chamber 5. The water 51 is at a level which partly fills the regions of the fluid channel 20 within each of the bottom copper band 23 and the intermediate copper band 22. The water fills only a small part of the region of the fluid channel 20 within the top copper band 21. In a similar way to that discussed previously, had the filling chamber 5 been rotated 45 degrees anticlockwise from the position shown in FIG. 4a, the filling chamber 5 would be unlikely to function properly. This is because the filling chamber outlet pipe 7 would be above the level of the water, causing air to pass into the filling chamber outlet pipe 7, even when there is water in the filling chamber 5. Additionally, the filling chamber inlet pipe 6 would be displaced from a top of the filling chamber 5, leaving a significant part of the filling chamber 5 from which air would not be able to escape back up the filling chamber inlet pipe 6.

FIG. 4c shows a filling chamber 5 provided in a horizontal orientation. The filling chamber outlet pipe 7 is provided on a lower left side of the filling chamber 5. The filling chamber inlet pipe 6 is provided on an upper right side of the filling chamber 5. As will be appreciated, the filling chamber 5 shown in FIG. 4b has been rotated by 90 degree in a clockwise direction relative to the position shown in FIG. 4c. The water 51 is at a level which partly fills the regions of the fluid channel 20 within each of the bottom copper band 23, the intermediate copper band 22 and the top copper band 21. If, instead, the filling chamber 5 had been rotated 90 degrees anti-clockwise from the position shown in FIG. 5a, the filling chamber 5 would be unlikely to function properly. This is because the filling chamber outlet pipe 7 would be above the level of the water, causing air to pass into the filling chamber outlet pipe 7, even when there is water in the filling chamber 5. Additionally, the filling chamber inlet pipe 6 would be displaced from a top of the filling chamber 5, leaving a significant part of the filling chamber 5 from which air would not be able to escape back up the filling chamber inlet pipe 6.

In some embodiments, a securing fastening is provided on the outer casing 24 to make it easier for an installer to provide the filling chamber inlet pipe 6 and the filling chamber outlet pipe 7 in the required position.

In the positions of the filling chamber 5 shown in both FIG. 4a and FIG. 4b, the measured capacitance of the lower planar plate capacitive sensor is greater than the capacitance of the upper planar plate capacitive sensor. In FIG. 4c, the measured capacitance of the lower planar plate capacitive sensor is substantially equal to the measured capacitance of the upper planar plate capacitive sensor.

Figure 5A:
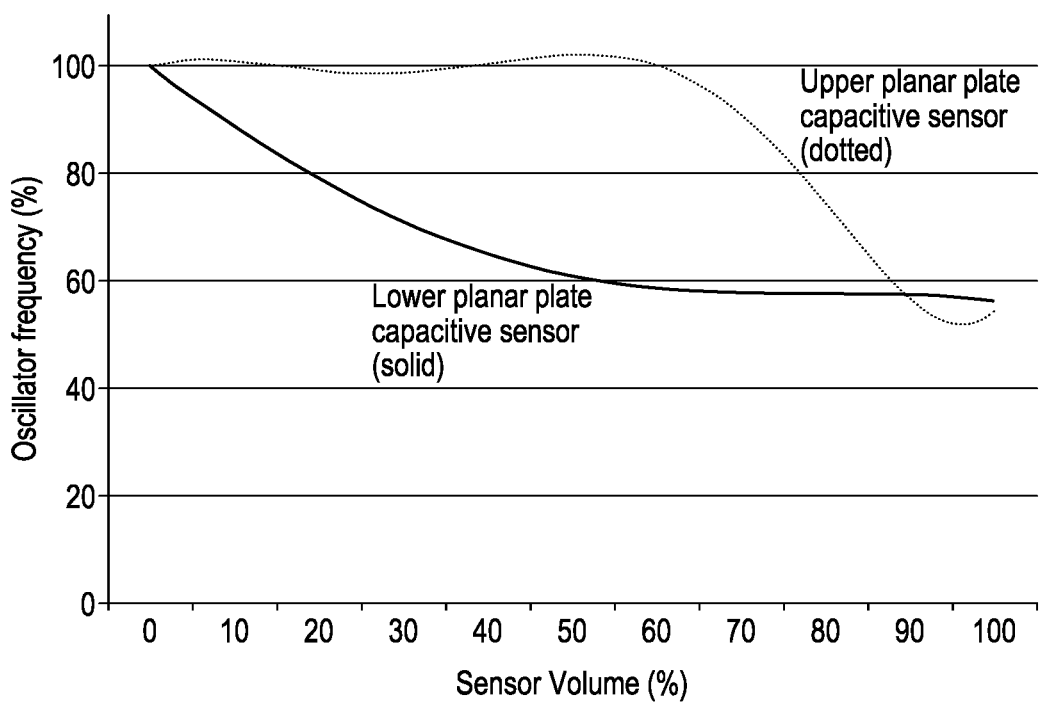
FIGS. 5a, 5b and 5c are graphs showing the responses of the fill level sensor when the filling chamber is at different orientations.
Figure 5B:
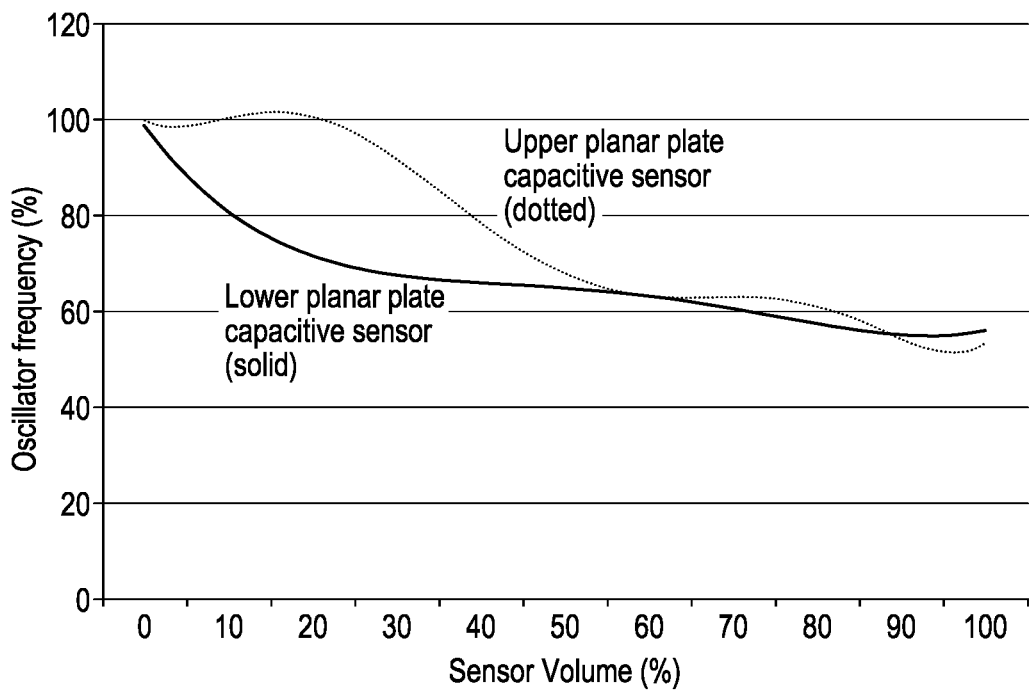
Figure 5C:
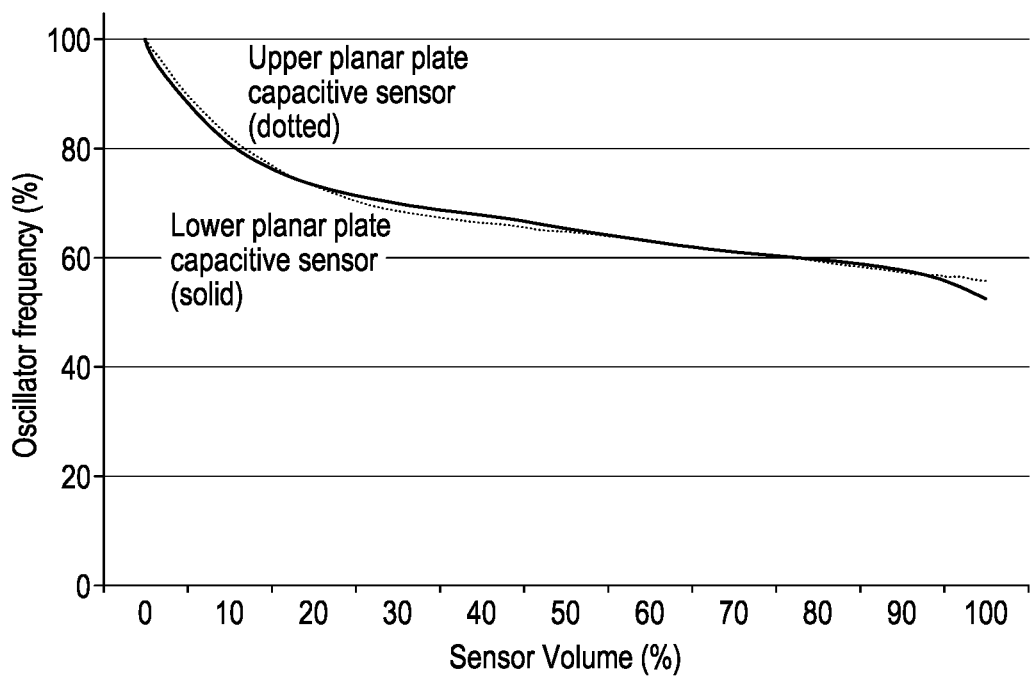

FIGS. 5a, 5b and 5c are graphs showing the responses of the fill level sensor when the filling chamber is at different orientations. The graphs show how the response of both the upper planar plate capacitive sensor and the lower planar plate capacitive sensor vary with a fill level of the filling chamber 5. As the filling chamber fills up past one of the capacitive sensors, the capacitance of the sensor will increase, resulting in a decrease in the frequency produced at the oscillator. The graph shown in FIG. 5a corresponds to the vertical orientation as shown in FIG. 4a. In this position, the upper planar plate capacitive sensor measures a low capacitance until the filling chamber 5 fills up with water to the level of the upper planar plate capacitive sensor. As the fill level increases further, the upper planar plate capacitive sensor measures an increasing capacitance, resulting in a drop of the frequency of the oscillator. The graph shown in FIG. 5b corresponds to the inclined orientation as shown in FIG. 4b. In this position, the upper planar plate capacitive sensor measures an increasing capacitance whilst the lower planar plate capacitive sensor is also measuring an increasing capacitance. The graph shown in FIG. 5c corresponds to the horizontal orientation as shown in FIG. 4c. In this position, the upper planar plate capacitive sensor and the lower planar plate capacitive sensor have substantially the same response to the changing fill level. As can be seen from the graphs, the capacitance profiles of the sensors for different fill conditions vary significantly depending on the orientation of the filling chamber 5. From the point at which the upper planar plate capacitive sensor begins to register an increase in capacitance, the angular orientation of the filling chamber 5 may be calculated. Using the sensor data, and this calculated angle, the sensor is then able to determine an estimated fill level for the filling chamber 5 in order to efficiently control the pump 3.

In order to accurately determine a fill level of the filling chamber 5, the sensor system must be calibrated. An incorrect calibration may result in the pump not turning off when the chamber is below a minimum fill level or the pump may not be pumping fast enough so that the fill level in the filling chamber 5 rises above a maximum fill level. Where the fill level rises above the maximum fill level, the system is configured to turn the air conditioning unit off as there is deemed to be an error in the pump system. Manual calibration of the system may be carried out during installation or maintenance of the system. Alternatively, the device may be automatically calibrated by monitoring an average response for the system. In some embodiments, the sensor system is arranged to automatically calibrate the system during first use of the filling chamber. By recording measurements from the capacitive sensors when the chamber is empty until when the readings no longer change, the capacitance values for an empty chamber and for a full chamber may be determined. By modifying these values using a safety margin, it is ensured that the system will always operate to switch on the pump with the water level rises significantly above the minimum fill level, switch off the pump when the water level drops below the minimum fill level and switch off the air conditioning unit when the fill level rises above the maximum fill level.

Whilst the terms bottom copper band, and top copper band have been used, in addition to the terms upper capacitive sensor and lower capacitive sensor, it will be appreciated that in some orientations the relevant top, upper, bottom or lower components will in fact be positioned in a location that is opposite to this, or where neither component is upper or lower relative to the other.

Whilst the presently described embodiments have used three separate copper bands to provide two capacitive sensors, other embodiments may provide two independent capacitive sensors, each having two copper bands to provide the planar plates requires. In some embodiments, a single copper band is provided on a substrate with at least one insulating portion having been provided during manufacturing by, for example, etching the copper away. Although the presently described example uses two capacitive sensors, alternative filling chambers may use more sensors to increase a reliability and resolution of the sensor system.

Whilst the presently described embodiments have used copper bands to provide the capacitive sensors, other electrically conductive materials, such as metals may be used. Moreover, it is not necessary for the bands to form complete rings, although this is desirable in order to ensure the maximum response of the sensors in all orientations.

Whilst the presently described examples have relate to a filling chamber fill level sensor for use in controlling a pump as part of an air conditioning system, it will be appreciated that the fill level sensor might also or instead be used simply to monitor a fill level in a chamber without controlling a pump in response to this. When the fill level sensor is configured to provide a control input to a pump, the fill level sensor may not be used as part of an air conditioning system. In fact, the fill level sensor connected to a pump may be used in any situation where a variable level of pumping may be required to remove excess or waste liquid from a process, where the liquid is produced at a non-constant rate.

In summary, a liquid level detector for use in a pump control system comprises a chamber 20 for liquid, a liquid inlet 6 to the chamber 20, a liquid outlet 7 from the chamber and connectable to a pump, and a capacitive sensor comprising mutually spaced capacitive sensor elements (21, 22; 22, 23) forming a capacitance which is sensitive to permittivity within a region of the chamber proximate the capacitive sensor. The chamber is defined at least partially by a barrier member 25 and the capacitive sensor elements are provided on the barrier member outside the chamber.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A liquid level detector for use in a pump control system, the liquid level detector adapted for connection to a condensate reservoir of an air conditioning system, a refrigeration system or a heating system and comprising:
   an enclosed filling chamber for liquid;
   a liquid inlet to the chamber;
   a liquid outlet from the chamber that is connectable to a pump, wherein the liquid outlet is positioned below the liquid inlet when the liquid level detector is connected, in use, to the condensate reservoir; and
   a first capacitive sensor including a first capacitive sensor element forming a first capacitance that is sensitive to permittivity within a first region of the chamber proximate the first capacitive sensor;
   a second capacitive sensor spaced from the first capacitive sensor and including a second capacitive sensor element forming a second capacitance that is sensitive to permittivity within a second region of the chamber proximate the second capacitive sensor,
   wherein each of the first and second capacitive sensor elements forms a ring around the chamber; and
   an electronic controller configured to receive output signals indicative of an amount of liquid in the chamber from the first and second capacitive sensors and to generate a control signal for controlling the pump, wherein the controller is configured to monitor the output signals and to and generate the control signal in response to the output signals to control a speed of the pump to maintain a desired amount of liquid in the chamber, and
   wherein the controller is configured to calculate an angle of orientation of the chamber by comparison of the output signals and generate the control signal based on the calculated angle and the output signals to control the pump in response to the amount of liquid in the chamber.

2. A liquid level detector as claimed in claim 1, wherein the first and second capacitive sensor elements are electrical conductors.

3. A liquid level detector as claimed in claim 1, wherein a spacing between the first and second capacitive sensor elements is less than about 5 mm.

4. A liquid level detector as claimed in claim 1, wherein the electronic controller is configured for electrical connection to the at least one of the first and second capacitive sensors, whereby the first and second capacitive sensors form part of an oscillator circuit in the controller with a frequency of the oscillator circuit indicative of the first and second capacitances respectively of the first and second capacitive sensors.

5. A liquid level detector as claimed in claim 1, wherein the pump is a reciprocating pump.

6. A liquid level detector as claimed in claim 1, wherein the chamber is substantially tubular, and wherein each of the first and second capacitive sensor elements is formed as a ring around a circumference of the tubular chamber.

7. A liquid level detector as claimed in claim 1, wherein a flow rate through the liquid outlet is up to 100 ml/minute.

8. A liquid level detector as claimed in claim 1, wherein the chamber is defined at least partially by a barrier member, and the capacitive sensor elements are provided on the barrier member outside the chamber.

9. A liquid level detector as claimed in claim 8, wherein the barrier member is formed from a plastic material.

10. A liquid level detector as claimed in claim 8, wherein the barrier member has a thickness of less than about 1 mm.

11. A liquid level detector as claimed in claim 8, wherein the barrier member is a tube.

\* \* \* \* \*